United States Patent
Moon et al.

(10) Patent No.: US 12,498,475 B2
(45) Date of Patent: Dec. 16, 2025

(54) OBJECT TRACKING METHOD BY USING SENSOR FUSION TECHNOLOGY AND VEHICLE DRIVING SYSTEM BY THE SAME

(71) Applicants: Hyundai Motor Company, Seoul (KR); Kia Corporation, Seoul (KR)

(72) Inventors: Ji Yang Moon, Seoul (KR); Hyung Jin Cha, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 363 days.

(21) Appl. No.: 17/895,602

(22) Filed: Aug. 25, 2022

(65) Prior Publication Data
US 2023/0258792 A1    Aug. 17, 2023

(30) Foreign Application Priority Data
Feb. 14, 2022   (KR) .......................... 10-2022-0018894

(51) Int. Cl.
G01S 13/86    (2006.01)
B60W 30/18    (2012.01)
G01S 17/89    (2020.01)

(52) U.S. Cl.
CPC ..... *G01S 13/865* (2013.01); *B60W 30/18109* (2013.01); *G01S 13/867* (2013.01); *G01S 17/89* (2013.01)

(58) Field of Classification Search
CPC ...... G01S 13/865; G01S 13/867; G01S 17/89; B60W 30/18109
USPC .......................................................... 342/54
See application file for complete search history.

(56) References Cited

U.S. PATENT DOCUMENTS

| | | |
|---|---|---|
| 2009/0040095 A1 | 2/2009 | Ogawa |
| 2016/0187465 A1 | 6/2016 | Yoon et al. |
| 2017/0213093 A1 | 7/2017 | Li et al. |
| 2018/0201258 A1* | 7/2018 | Luo ........................ B60W 40/04 |
| 2019/0004166 A1* | 1/2019 | Orlowski .............. G01S 13/726 |

(Continued)

FOREIGN PATENT DOCUMENTS

| | | |
|---|---|---|
| JP | 2009042181 A | 2/2009 |
| JP | 6364049 B2 | 7/2018 |

(Continued)

OTHER PUBLICATIONS

Chiang et al. "Performance Enhancement of INS/GNSS/Refreshed-SLAM Integration for Acceptable Lane-Level Navigation Accuracy," IEEE Transactions on Vehicular Technology, vol. 69, No. 3, Mar. 20, pp. 2463-2477 (Year: 2020).*

(Continued)

*Primary Examiner* — William Kelleher
*Assistant Examiner* — Samarina Makhdoom
(74) *Attorney, Agent, or Firm* — SLATER MATSIL, LLP (57) ABSTRACT

An embodiment object tracking method by use of sensor fusion technology includes creating a LiDAR track that tracks an object according to point clouds extracted from LiDAR data of the object, creating a non-final sensor fusion track for the object according to camera data or radar data in addition to the LiDAR data, assessing consistency of a heading angle of the LiDAR track, and determining the heading angle of the LiDAR track to be a heading angle of a final sensor fusion track according to a result of assessing the consistency.

17 Claims, 8 Drawing Sheets

(56) References Cited

U.S. PATENT DOCUMENTS

| | | | |
|---|---|---|---|
| 2020/0111362 A1 | 4/2020 | Sohn | |
| 2020/0341117 A1* | 10/2020 | Sandford | G01S 17/93 |
| 2020/0377089 A1* | 12/2020 | Fukushige | B60W 30/12 |
| 2021/0124052 A1 | 4/2021 | Sawada | |
| 2021/0263157 A1* | 8/2021 | Zhu | G01S 17/89 |

FOREIGN PATENT DOCUMENTS

| | | |
|---|---|---|
| JP | 2021067646 A | 4/2021 |
| KR | 20160082309 A | 7/2016 |
| KR | 20180138477 A | 12/2018 |
| KR | 20200040356 A | 4/2020 |
| KR | 20200054373 A | 5/2020 |
| KR | 20200104258 A | 9/2020 |

OTHER PUBLICATIONS

Daza et al. "Fail-Aware LIDAR-Based Odometry for Autonomous Vehicles," Sensors MDPI, Sensors 2020, 20, 4097; doi:10.3390/s20154097 pp. 1-20 (Year: 2020).*

Sun et al. "Scalability in Perception for Autonomous Driving: Waymo Open Dataset," Computer Vision Foundation CVPR 2020 pp. 2446-2454 (Year: 2020).*

* cited by examiner

OBJECT TRACKING METHOD BY USING SENSOR FUSION TECHNOLOGY AND VEHICLE DRIVING SYSTEM BY THE SAME

CROSS-REFERENCE TO RELATED APPLICATIONS

This application claims the benefit of Korean Patent Application No. 10-2022-0018894, filed on Feb. 14, 2022, which application is hereby incorporated herein by reference.

TECHNICAL FIELD

The present disclosure relates to an object tracking method by use of sensor fusion technology and a vehicle driving system by the same.

BACKGROUND

With a higher level of the autonomous drive, the request for the precision of object detection and tracking becomes greater.

And, for enhancement of the precision, sensor fusion technology using multiple different sensors is actively developed.

The precision is greatly enhanced with the sensor fusion compared to when only a single sensor is used because drawbacks of each single sensor can be made up for by strong traits of other sensors.

For example, a camera is good at classification of objects such as a car, a commercial vehicle (truck, bus, etc.), a two-wheeled vehicle, a pedestrian, a bicycle, etc. but its degree of precision for object detection is not good enough. Radar is good at detection of speed of an object, but its ability of classification is limited to whether the object is moving or stationary. LiDAR is very good at detection of the shape and the distance of an object, but its ability of classification is poor too.

A set of sensor fusion data for an object is obtained by fusing data sensed by multiple sensors in terms of the strong traits thereof, and the fusion data are tracked with a track (referred to as a 'sensor fusion track' hereinafter) which, for example, may be programmatically defined by a rectangular box with the fusion data associated.

There is a case where the heading angle of the sensor fusion track is dependent on the heading angle of a track created according to LiDAR points of the object (referred to as a 'LiDAR track' hereinafter).

Therefore, if the heading angle of a LiDAR track is wrong, then the autonomous drive control is greatly influenced.

Figure 1:
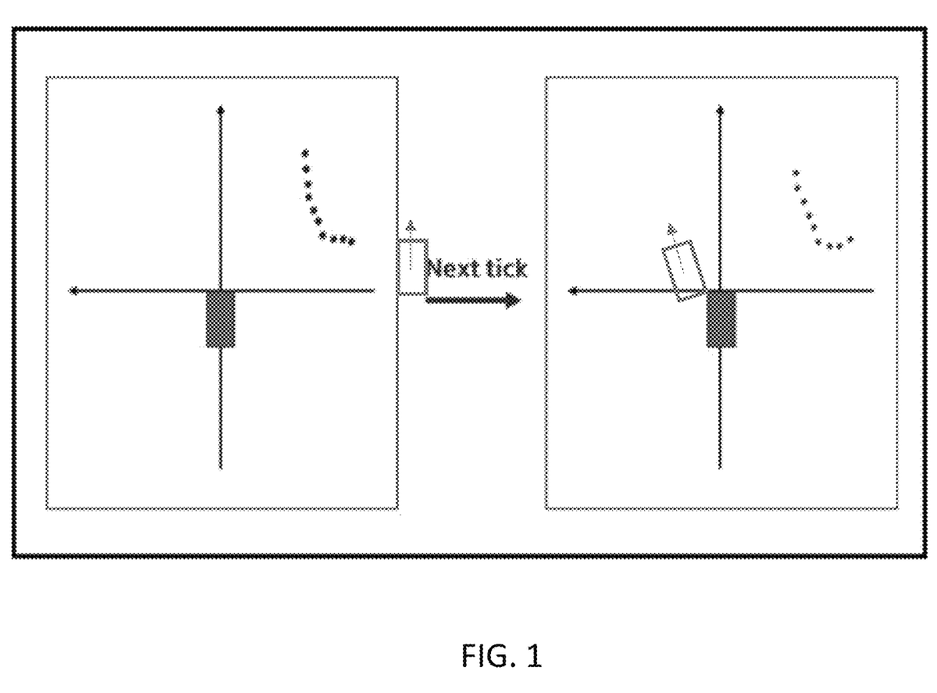
FIG. 1 represents an example of a situation where the heading angle of a LiDAR track (referred to as a 'LiDAR heading angle') is rapidly changed.

For example, as shown in FIG. 1, there is a case where data processing or analysis shows that the heading angle of a current LiDAR track (the right-side picture in FIG. 1) has been rapidly changed from the heading angle of the previous LiDAR track (the left-side picture in FIG. 1) for an object which is tracked by use of a sensor fusion track.

If the rapid change is resulted from a real behavior of the object, then it causes no problem, however, if there is an error in determining the heading angle of the LiDAR track and the errant heading angle is used as the heading angle of the sensor fusion track, then it is problematic.

This kind of error in the heading angle may occur, in particular, when a target vehicle comes close to and overtakes the host vehicle, or is cornering or trying to cut-in, and the errant heading angle may be a cause of an unnecessary acceleration/deceleration situation.

Accordingly, in a case where there is a high chance that the heading angle of a LiDAR track is wrong, it is preferred to check the consistency and determine the heading angle of the object according to the check result.

The information included in this background section is only for enhancement of understanding of the general background of the present disclosure and may not be taken as an acknowledgement or any form of suggestion that this information forms the prior art already known to a person skilled in the art.

SUMMARY

Various embodiments of the present disclosure provide an object tracking method by use of sensor fusion technology and a vehicle driving system by the same, in which a heading angle is determined according to the consistency of the heading angle of a LiDAR track.

An object tracking method by use of sensor fusion technology, according to an embodiment of the present invention, comprises creating a LiDAR track, for tracking an object, according to point clouds extracted from LiDAR data of the object, creating a non-final sensor fusion track for the object according to camera data and/or radar data in addition to the LiDAR data, assessing consistency of a heading angle of the LiDAR track, and determining the heading angle of the LiDAR track to be a heading angle of a final sensor fusion track according to a result of the assessment of the consistency.

In at least one embodiment, the consistency is assessed with a registration result of registering the point clouds.

In at least one embodiment, the registration is performed by use of an ICP algorithm.

In at least one embodiment, the point clouds include 2 or more layers of point clouds.

In at least one embodiment, in the consistency assessment, the heading angle of the LiDAR track is assessed to be inconsistent if a heading angle change of the LiDAR track is equal to or over a first threshold and a rotational angle change of a contour of a point cloud resulted from the registration is equal to or below a second threshold, and consistent otherwise.

In at least one embodiment, the heading angle of the LiDAR track is determined to be the heading angle of the final sensor fusion track in the case of the heading angle of the LiDAR track being assessed to be consistent.

In at least one embodiment, in the case of the heading angle of the LiDAR track being assessed to be inconsistent, the heading angle of the LiDAR track is determined to be the heading angle of the final sensor fusion track if a difference between the heading angle and a path angle of the LiDAR track is equal to or below a third threshold and a difference between a heading angle and a path angle of the non-final sensor fusion track is equal to or over a fourth threshold.

In at least one embodiment, in the case of the heading angle of the LiDAR track being assessed to be inconsistent, the heading angle of the non-final sensor fusion track is determined to be the heading angle of the final sensor fusion track if the difference between the heading angle and the path angle of the LiDAR track is over the third threshold and the difference of the heading angle and the path angle of the non-final sensor fusion track is below the fourth threshold.

In at least one embodiment, whether the consistency assessment is to be performed is determined according to an assessment of reliability of the heading angle of the LiDAR track.

In at least one embodiment, the consistency assessment is performed when the reliability is assessed high.

In at least one embodiment, when the reliability is assessed low, the heading angle of the LiDAR track is determined to be the heading angle of the final sensor fusion track if a difference between a heading angle and a path angle of the non-final sensor fusion track is equal to or over a fifth threshold and a difference between the heading angle and a path angle of the LiDAR track is equal to or below a sixth threshold.

In at least one embodiment, when the reliability is assessed low, the heading angle of the non-final sensor fusion track is determined to be the heading angle of the final sensor fusion track if the difference between the heading angle and the path angle of the non-final sensor fusion track is below the fifth threshold and the difference between the heading angle and the path angle of the LiDAR track is over the sixth threshold.

A vehicle driving system according to an embodiment of the present invention is a driving system in which the above described methods are applied and which can be equipped in a vehicle.

In at least one embodiment, the vehicle driving system may comprise a driving strategy unit which comprises a microprocessor configured to execute the above described methods.

According to at least one embodiment of the present invention, error in tracking an object due to an errant heading angle of a LiDAR track can be alleviated.

The methods and apparatuses of embodiments of the present disclosure have other features and advantages which will be apparent from or are set forth in more detail in the accompanying drawings, which are incorporated herein, and the following detailed description, which together serve to explain certain principles of the present disclosure.

It may be understood that the appended drawings are not necessarily to scale, presenting a somewhat simplified representation of various features illustrative of the basic principles of the present disclosure. The specific design features of embodiments of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawings.

DETAILED DESCRIPTION OF ILLUSTRATIVE EMBODIMENTS

Reference will now be made in detail to various embodiments of the present disclosure, examples of which are illustrated in the accompanying drawings and described below. While the present disclosure will be described in conjunction with exemplary embodiments of the present disclosure, it will be understood that the present description is not intended to limit the present disclosure to those exemplary embodiments of the present disclosure. On the other hand, the present disclosure is intended to cover not only the exemplary embodiments of the present disclosure, but also various alternatives, modifications, equivalents and other embodiments, which may be included within the spirit and scope of the present disclosure as defined by the appended claims.

In case where identical elements are included in various embodiments, they will be given the same reference numerals, and redundant description thereof will be omitted. In the following description, the terms "module" and "unit" for referring to elements are assigned and used interchangeably in consideration of convenience of explanation, and thus, the terms per se do not necessarily have different meanings or functions.

Furthermore, in describing the exemplary embodiments, when it is determined that a detailed description of related publicly known technology may obscure the gist of the exemplary embodiments, the detailed description thereof will be omitted. The accompanying drawings are used to help easily explain various technical features and it should be understood that the exemplary embodiments presented herein are not limited by the accompanying drawings. Accordingly, embodiments of the present disclosure should be construed to extend to any alterations, equivalents and substitutes in addition to those which are particularly set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the exemplary embodiments, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Unless otherwise defined, all terms including technical and scientific ones used herein have the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Furthermore, the term "unit" or "control unit" included in the names of a hybrid control unit (HCU), a motor control unit (MCU), etc. is merely a widely used term for naming a controller configured for controlling a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determinations, calculations, decisions, etc. necessary for controlling a function assigned thereto.

Figure 2:
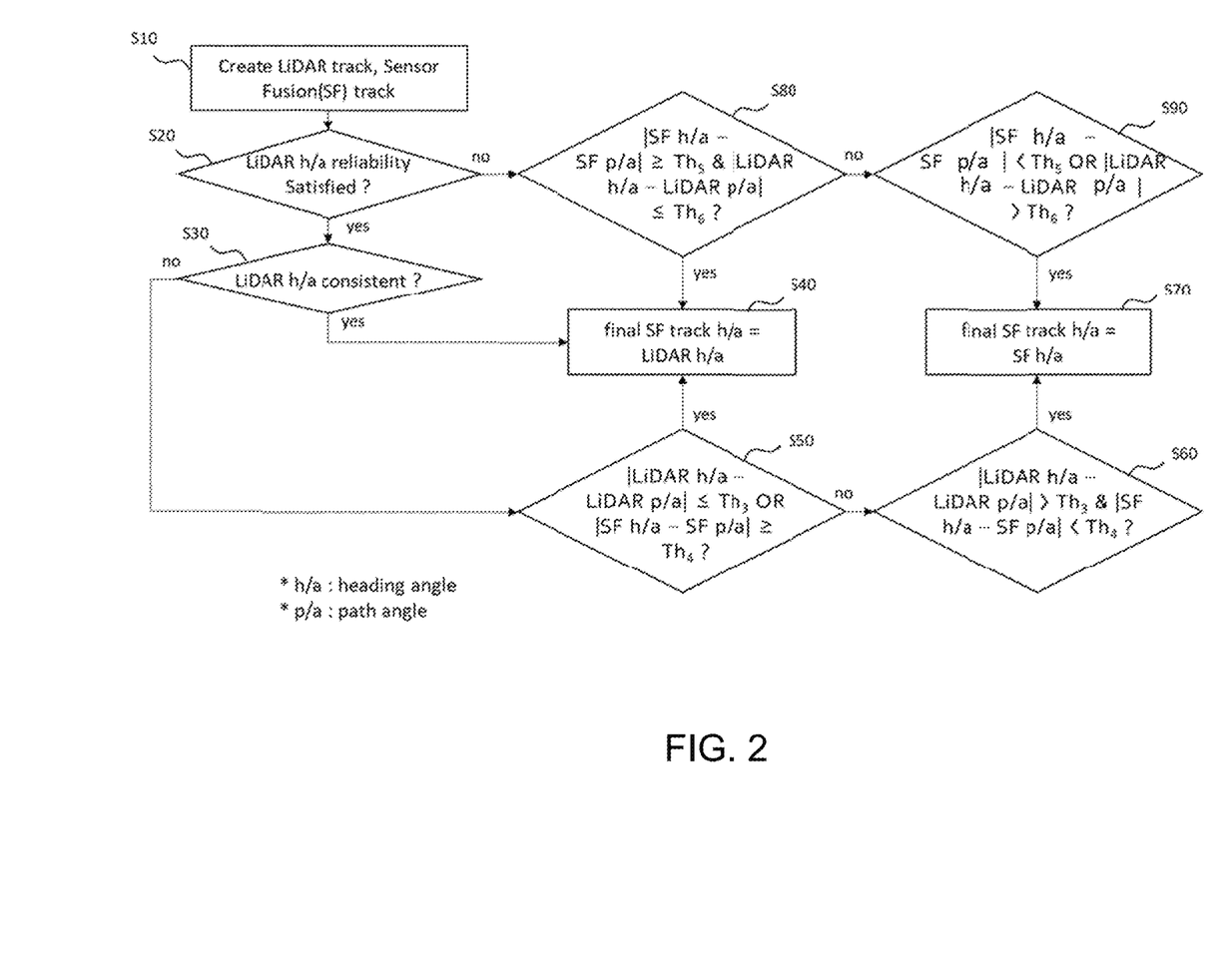
FIG. 2 represents an example of a flowchart for an object tracking method according to an embodiment of the present invention.
Figure 3:
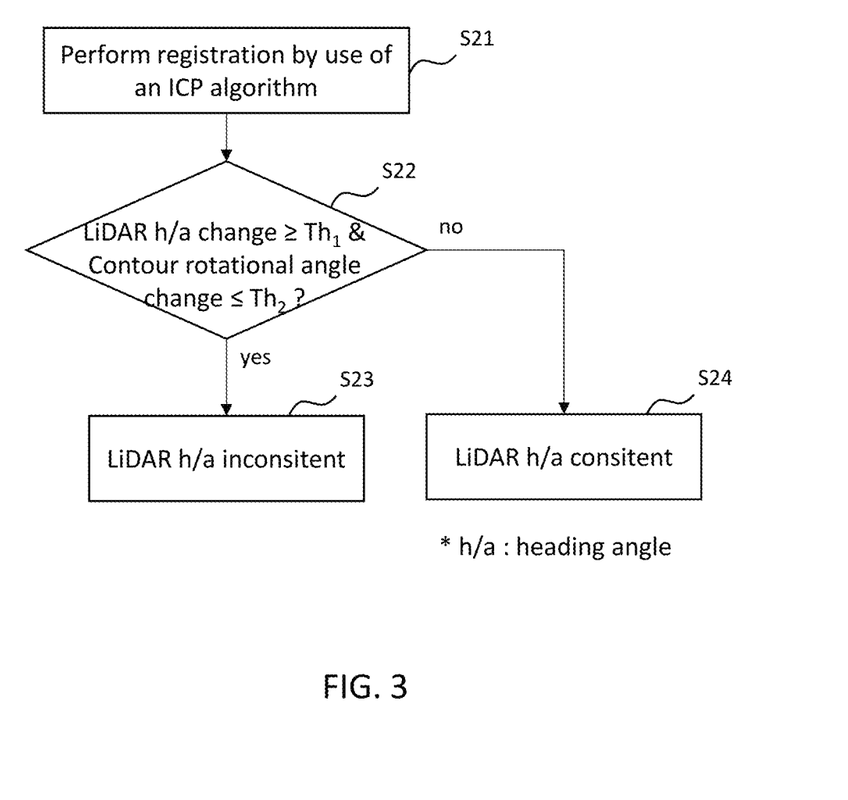
FIG. 3 represents an example of a flowchart for assessing consistency of a LiDAR heading angle according to an embodiment of the present invention.

An object tracking method according to an embodiment of the present invention, of which the processes are represented through the flowcharts of FIGS. 2 and 3, is detailed below with reference to FIGS. 4 to 7.

At first, a conventional method may be used in detecting and tracking an object by use of a LiDAR sensor. It is known that LiDAR point data is obtained for objects around a vehicle, and an object of interest is detected through data processing for the obtained LiDAR data and tracked by a track created as associated thereto, so the detailed description is omitted herein.

Also, it is known how an object is detected and tracked by a track through sensor fusion technology by use of a camera or a radar with a LiDAR sensor, and so the detailed description is omitted too.

The present embodiment relates to how the heading angle of a final sensor fusion track is determined according to the consistency of the heading angle of a LiDAR track, and so the description below is mainly focused thereon.

In the present embodiment, the term 'non-final sensor fusion track' refers to a sensor fusion track before a heading angle of an object is finally determined, which is created as associated to the object for the tracking after the object is detected by use of sensor fusion technology, and the term 'final sensor fusion track' refers to a sensor fusion track of which the heading angle is finally determined. In the present embodiment, if a LiDAR heading angle is determined to be a final heading angle, then the final sensor fusion track is determined according to the LiDAR track, and if the heading angle of a non-final sensor fusion track is determined to be the final heading angle, then the final sensor fusion track is determined according to the non-final sensor fusion track.

With reference to FIG. 2, once a LiDAR track and a non-final sensor fusion track have been created in Step S10, the reliability of the LiDAR heading angle is first assessed in Step S20.

If the reliability is satisfactory, i.e., a reliability score output when the LiDAR track created is beyond a predetermined threshold, then the consistency of the LiDAR heading angle is assessed in Step S30.

For the assessment of the consistency, as shown in FIG. 3, the contours of the LiDAR points are first registered by use of an ICP algorithm in Step S21.

An ICP algorithm is a registering algorithm which, in a case where there are two point clouds of different time points or LiDAR sensor locations for an object, can merge the two sets of data like a jigsaw puzzle. ICP refers to 'Iterative Closest Point' because closest points are repeatedly merged like a jigsaw puzzle.

Figure 4:
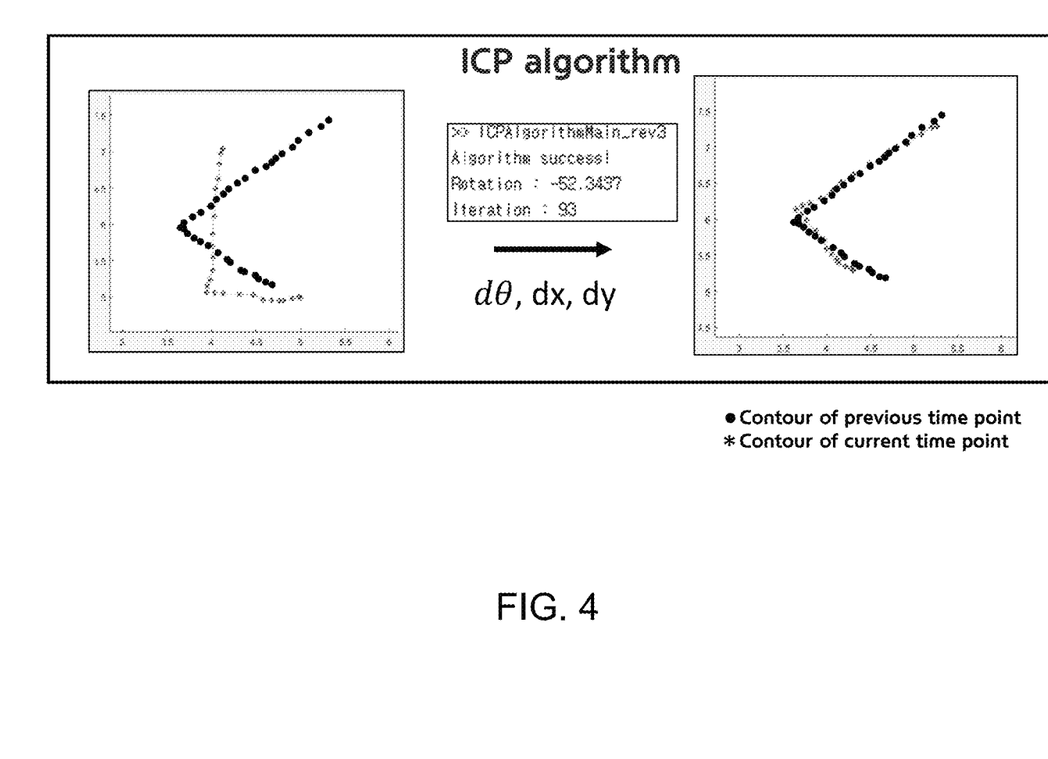
FIG. 4 represents an example of a process for registering by use of an ICP algorithm.

FIG. 4 represents an example of a process for registering by use of an ICP algorithm.

As shown in FIG. 4, a contour of LiDAR points of an object at a current time point can be shown as shifted in the x and/or y axis and/or rotated by a certain angle θ from the contour at the previous time point. Though an actual movement of the object may cause such location and angle changes dx, dy, dθ, they may be due to a disturbance such as a vibration that happens while the LiDAR data is being obtained. The ICP algorithm outputs such location and angle changes dx, dy, dθ, and if registration is accordingly carried out, then a result, for example, like the right side in FIG. 4 can be obtained.

There may be various methods for matching the two contours, but the ICP algorithm is preferred for registration of LiDAR data in which sensor noises are necessarily contained, because it does not require the point numbers be the same between the two contours due to it matching closest points in terms of Euclidean distance for registration, and even though the contour shapes are a little different from each other, it converges well.

In a case where running the ICP algorithm does not converge and thus the registration is failed, the corresponding logic may be ended with the corresponding LiDAR data deemed to be unreliable.

In the present embodiment, the total point cloud may include 2 or more layers of point cloud.

With the registration for the contours completed, a rotational angle change between the contours is calculated.

And, it is determined whether the change of the LiDAR heading angle is equal to or over a first threshold and the rotational angle change between the contours is equal to or below a second threshold in Step S22.

If it is determination that the change of the LiDAR heading angle is equal to or over the first threshold and the rotational angle change between the contours is equal to or below the second threshold, then the corresponding LiDAR heading angle is determined as 'inconsistent' in Step S23, otherwise 'consistent' in Step S24.

In other words, if a LiDAR heading angle is determined to be greatly changed despite the contour being little rotated, the heading angle is determined as 'inconsistent.'

If the LiDAR heading angle is determined as 'consistent,' the LiDAR heading angle is determined to be the heading angle of the final sensor fusion track in Step S40.

And, in a case where, with the LiDAR heading angle determined as 'inconsistent,' the difference between the LiDAR heading angle and a path angle is equal to or below a third threshold, or the difference between the heading angle of the non-final sensor fusion track and the path angle is equal to or over a fourth threshold (first case), the LiDAR heading angle is determined to be the heading angle of the final sensor fusion track in Steps S50 and S40.

The path angle may be determined by the angle of a velocity vector of the corresponding object. In other words, a LiDAR path angle may be calculated through the angle of a velocity vector of the object calculated from LiDAR data thereof. And, a path angle of a non-final sensor fusion track may be calculated from the angle of a velocity vector determined by use of sensor fusion technology for the object.

If the LiDAR heading angle is determined as 'inconsistent' and it is not the above first case, then the heading angle of the non-final sensor fusion track is determined to be the heading angle of the final sensor fusion track in a case where the difference between the LiDAR heading angle and the path angle is over the third threshold and the difference between the heading angle of the non-final sensor fusion track and the path angle is below the fourth threshold (second case) in Steps S60 and S70.

Figure 5:
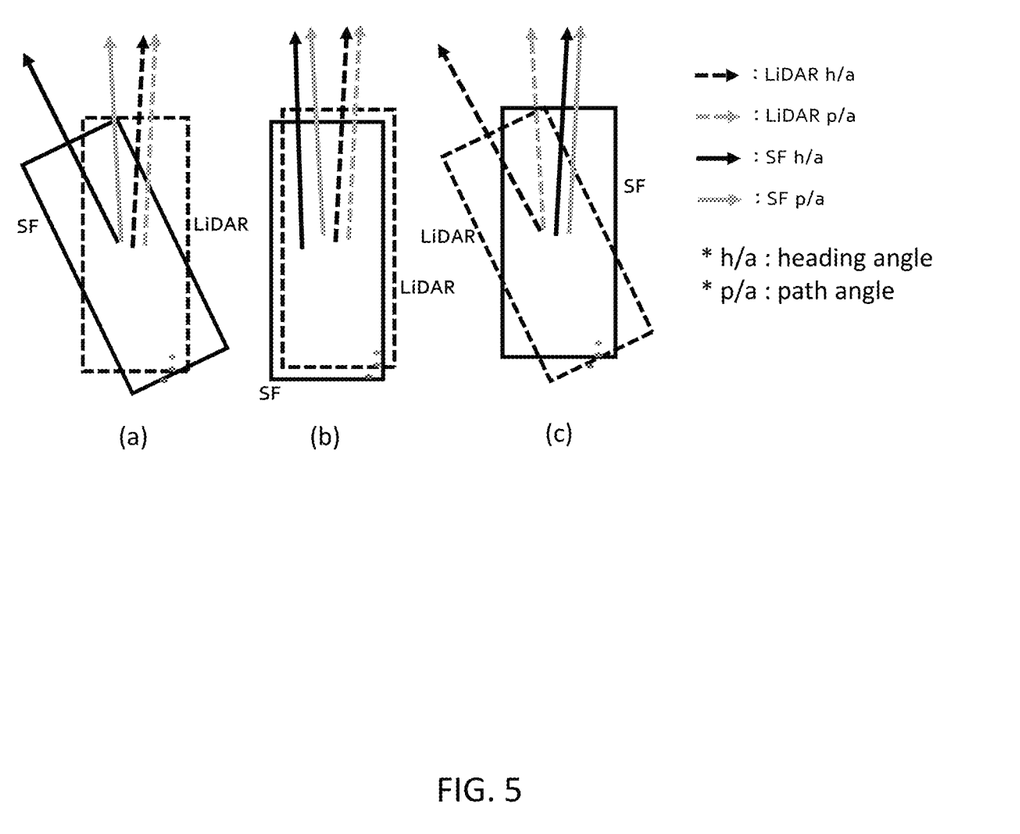
FIG. 5 represents an example of determining the heading angle of a final sensor fusion track in a case where the heading angle of a LiDAR track satisfies a reliability condition.

FIG. 5 represents examples for the first and second cases, Examples (a) and (b) represent the first case where the LiDAR heading angle is determined to be the heading angle of the final sensor fusion track, and Example C represents the second case where the heading angle of the non-final sensor fusion track is determined to be the final heading angle.

On the other hand, if the reliability level is determined to be low with an assessment of reliability of the LiDAR heading angle in Step S20, the LiDAR heading angle is determined to be the heading angle of the final sensor fusion track in a case where the difference between the heading angle of the non-final sensor fusion track and the path angle is equal to or over a fifth threshold and the difference between the LiDAR heading angle and the path angle is equal to or below a sixth threshold (third case) in Steps S80 and S40.

And, if the reliability level of the LiDAR heading angle is low and it is not the third case, the heading angle of the non-final sensor fusion track is determined to be the heading angle of the final sensor fusion track in a case where the difference between the sensor fusion angle and the path angle is below the fifth threshold or the difference between the LiDAR heading angle and the path angle is over the sixth threshold (fourth case) in Steps S90 and S70.

Figure 6:
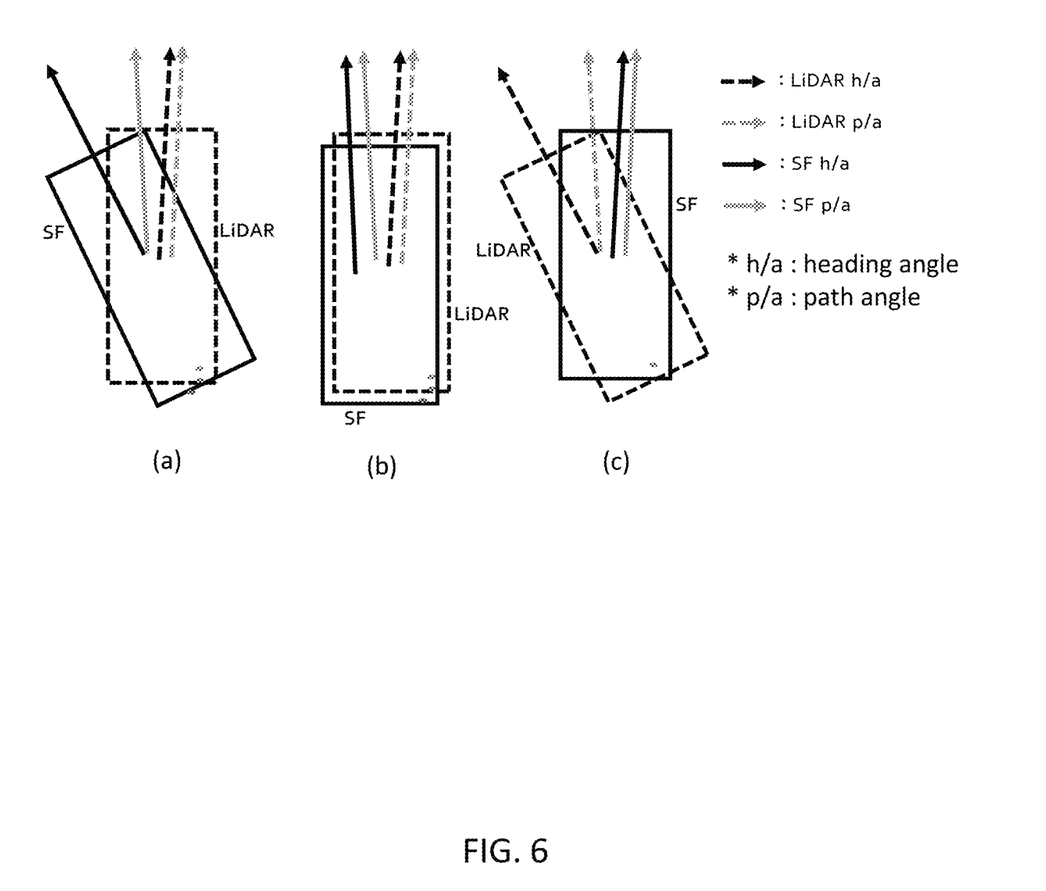
FIG. 6 represents an example of determining the heading angle of a final sensor fusion track in a case where the LiDAR heading angle does not satisfy the reliability condition.

FIG. 6 represents examples for the third and fourth cases, Example (a) represents the third case where the LiDAR heading angle is determined to be the heading angle of the final sensor fusion track, and Examples (b) and (c) represent the fourth case where the heading angle of the non-final sensor fusion track is determined to be the final heading angle.

The third threshold and the sixth threshold may have the same value, and also the fourth threshold and the fifth threshold may have the same value. Also, the third to the sixth thresholds may have the same value.

Figure 7:
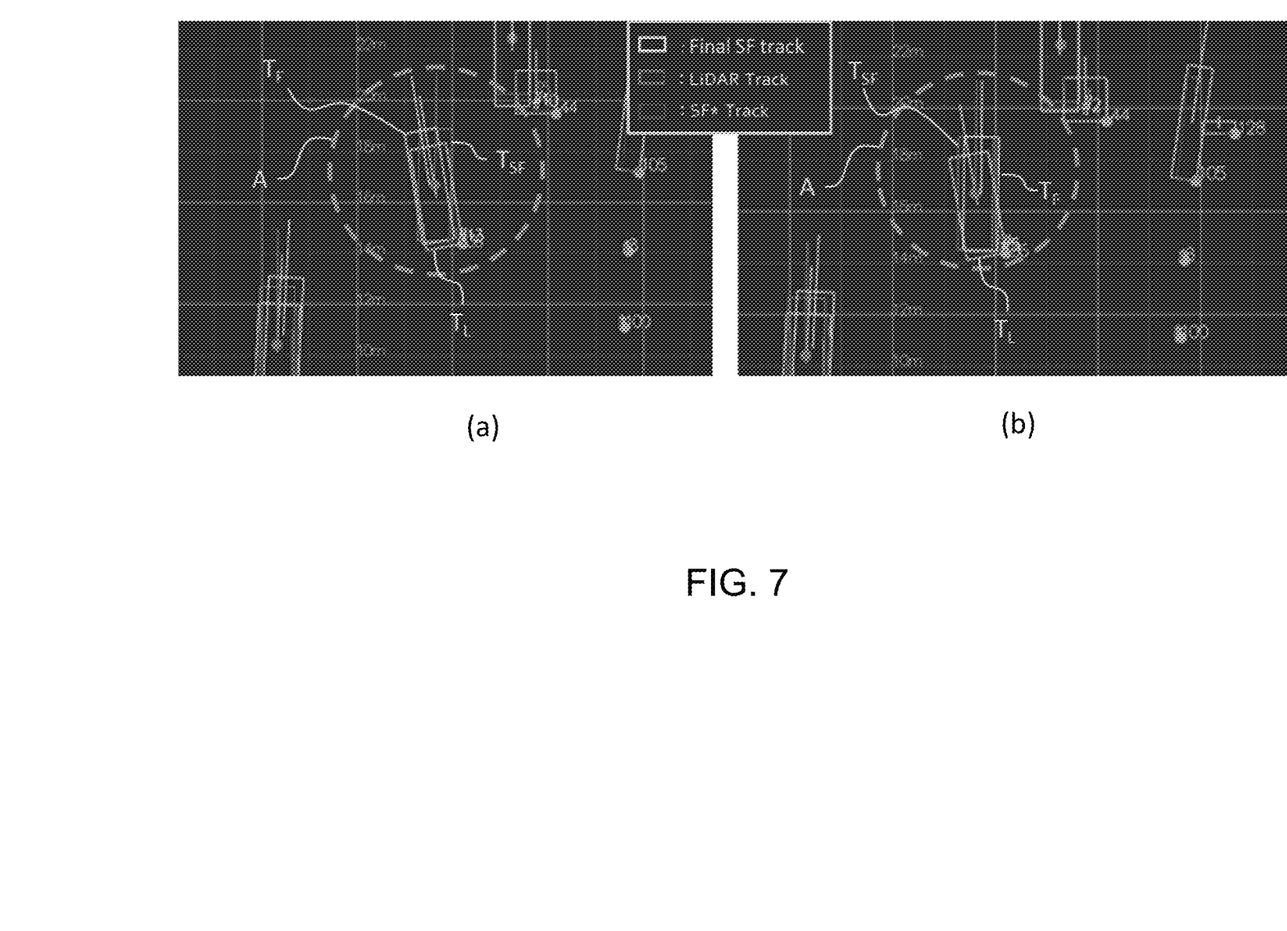
FIG. 7 represents a result of comparison of the heading angles of a non-final sensor fusion track for real LiDAR point data between a method according to an embodiment of the present invention and a conventional one.

FIG. 7 represents a result of comparison of the heading angles of a non-final sensor fusion track for real LiDAR point data between a method according to an embodiment of the present invention and a conventional one.

Example (a) represents the case where a final heading angle is determined according to a conventional method, and Example (b) represents the case where a final heading angle is determined according to an embodiment of the present invention.

It can be understood that in the case according to the conventional method, as shown in Example (a), the heading angle of a LiDAR track $T_L$ is determined to be the heading angle of a final sensor fusion track $T_F$ and thus the errant LiDAR heading angle is used as it is, but in the case according to the present embodiment, as shown in Example (b), the heading angle of the non-final sensor fusion track $T_{SF}$ is determined to be the final heading angle.

The above described method may be applied to a vehicle driving system 60 and thus used for a vehicle having the vehicle driving system 60 installed therein. A vehicle driving system 60 according to an embodiment of the present invention will be detailed below through the conceptual diagram of FIG. 8.

Figure 8:
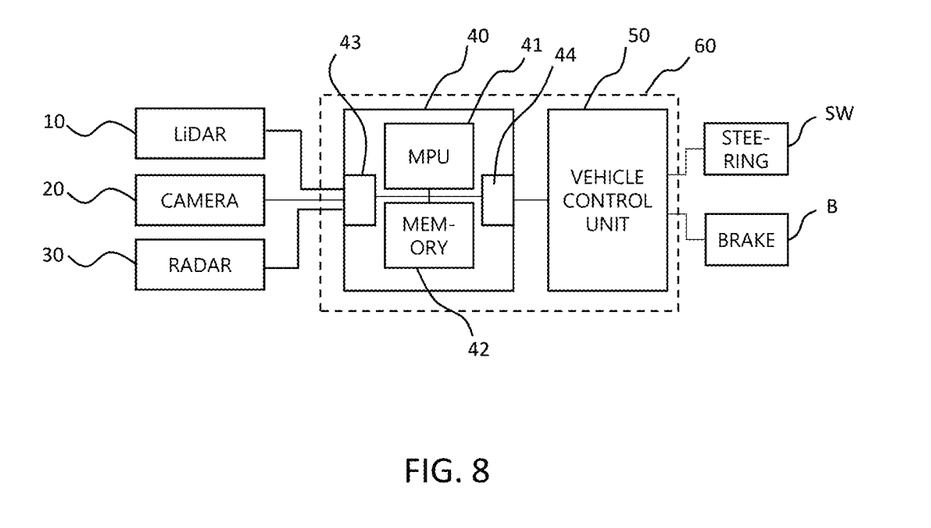
FIG. 8 represents an example of a vehicle driving system according to an embodiment of the present invention.

At first, the vehicle driving system 60 comprises a driving strategy unit 40 and a vehicle control unit 50.

A camera 20 and a radar 30 are comprised as non-LiDAR sensors in addition to a LiDAR sensor 10 for detecting and tracking objects around the vehicle.

Positions at which the sensors 10, 20, and 30 are installed in the vehicle may be respectively selected according to the optimal performance of each sensor, and do not necessarily have to be the same. However, in order to fuse two or more sensors, different coordinate systems of each sensor must be moved to one coordinate system and then fused.

For example, after mounting two sensors, which are the camera 20 and the LiDAR 10, at positions capable of achieving optimal performance, respectively, and performing object detection by each of the sensors 10 and 20, the pixel coordinates of the camera 20 are converted into the world coordinates of the LiDAR 10 and the world coordinates of the LiDAR 10 are converted into the pixel coordinates of the camera 20 so as to fuse the same.

The driving strategy unit 40 includes an input device 43, an output device 44, a microprocessor 41, a memory 42, and the like.

Data obtained from the LiDAR 10, the camera 20, the radar 30, etc. is input to the driving strategy unit 40 through the input device 43. Here, pre-processing of data may be performed in a processor of each sensor, such as the LiDAR 10, the camera 20, and the radar 30, and thus the data input to the input device 43 may be extracted data only for objects of interest. Of course, it is obvious that the data may be input to the driving strategy unit 40 without such pre-processing.

In the microprocessor 41, the above described method is installed as a program, and it performs the determining of the heading angle of the object and the tracking according to the method of the above described embodiment, upon data being input from the respective sensors 10, 20 and 30.

The memory 42 stores an operating system or logic commands, input/output information, the above-described evaluation value, etc.

The result determined by the driving strategy unit 40 is transmitted to the vehicle control unit 50 through the output device 44.

Then, the vehicle control unit 5o transmits a control signal(s) to a steering wheel SW and/or a brake B.

On the other hand, embodiments of the present disclosure described above may be embodied as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the claims appended hereto and their equivalents.

What is claimed is:

1. An object tracking method by use of sensor fusion technology, the method being executed by a vehicle that comprises LiDAR, at least one of a camera and a radar, and at least one microprocessor, the method comprising:
    obtaining LiDAR data of an object around the vehicle by use of the LiDAR, the object being selected from among a plurality of objects around the vehicle through data processing for LiDAR point cloud data obtained for the plurality of objects;
    obtaining camera or radar data of the object by use of the camera or the radar;
    creating, by the microprocessor, a LiDAR track in association with the object to track the object;
    creating, by the microprocessor, a non-final sensor fusion track in association with the object according to the camera or radar data in addition to the LiDAR data;
    assessing, by the microprocessor, consistency of a heading angle of the LiDAR track; and
    determining, by the microprocessor, the heading angle of the LiDAR track to be a heading angle of a final sensor fusion track associated with the object according to a result of assessing the consistency,
    wherein:
        whether assessing the consistency is to be performed is determined according to an assessment of reliability of the heading angle of the LiDAR track, and
        when the reliability is assessed low, the heading angle of the LiDAR track is determined to be the heading angle of the final sensor fusion track if a difference between a heading angle and a path angle of the non-final sensor fusion track is equal to or over a fifth threshold and a difference between the heading angle and a path angle of the LiDAR track is equal to or below a sixth threshold.

2. The method of claim 1, wherein the consistency is assessed with a registration result of registering point clouds.

3. The method of claim 2, wherein the registering is performed by use of an ICP algorithm.

4. The method of claim 3, wherein the point clouds comprise two or more point cloud layers.

5. The method of claim 2, wherein, in assessing the consistency, the heading angle of the LiDAR track is assessed to be inconsistent if a heading angle change of the LiDAR track is equal to or over a first threshold and a rotational angle change of a contour of a point cloud resulted from the registering is equal to or below a second threshold, and the heading angle of the LiDAR track is assessed to be consistent otherwise.

6. The method of claim 5, wherein the heading angle of the LiDAR track is determined to be the heading angle of the final sensor fusion track when the heading angle of the LiDAR track is assessed to be consistent.

7. The method of claim 5, wherein, when the heading angle of the LiDAR track is assessed to be inconsistent, the heading angle of the LiDAR track is determined to be the heading angle of the final sensor fusion track if a difference between the heading angle and a path angle of the LiDAR track is equal to or below a third threshold and a difference between the heading angle and the path angle of the non-final sensor fusion track is equal to or over a fourth threshold.

8. The method of claim 7, wherein, when the heading angle of the LiDAR track is assessed to be inconsistent, the heading angle of the non-final sensor fusion track is determined to be the heading angle of the final sensor fusion track if the difference between the heading angle and the path angle of the LiDAR track is over the third threshold and the difference between the heading angle and the path angle of the non-final sensor fusion track is below the fourth threshold.

9. The method of claim 1, wherein assessing the consistency is performed when the reliability is assessed high.

10. The method of claim 1, wherein the heading angle of the non-final sensor fusion track is determined to be the heading angle of the final sensor fusion track if the difference between the heading angle and the path angle of the non-final sensor fusion track is below the fifth threshold and the difference between the heading angle and the path angle of the LiDAR track is over the sixth threshold.

11. A vehicle driving system for a vehicle comprising:
    a driving strategy unit configured to:
        create a LiDAR track in association with an object to track the object around the vehicle, the object being selected from among a plurality of objects around the vehicle through data processing for LiDAR point cloud data obtained for the plurality of objects;
        create a non-final sensor fusion track in association with the object according to camera data or radar data in addition to LiDAR data of the object;
        determine a heading angle of the LiDAR track to be a heading angle of a final sensor fusion track associated with the object according to an assessment of consistency of the heading angle of the LiDAR track to create a driving strategy; and
        correspondingly output control values for a motor and a brake; and
    a drive controller configured to output control signals for the motor and the brake by use of the control values,
    wherein the driving strategy unit is further configured to:
        determine whether the assessment of consistency is to be performed based on an assessment of reliability of the heading angle of the LiDAR track; and
        determine, when the reliability is assessed low, the heading angle of the LiDAR track to be the heading angle of the final sensor fusion track if a difference between a heading angle and a path angle of the non-final sensor fusion track is equal to or over a fifth threshold and a difference between the heading angle and a path angle of the LiDAR track is equal to or below a sixth threshold.

12. The vehicle driving system of claim 11, wherein the consistency is assessed with a registration result of registering point clouds.

13. The vehicle driving system of claim 12, wherein the registration is performed by use of an ICP algorithm.

14. The vehicle driving system of claim 12, wherein, in the assessment of the consistency, the heading angle of the LiDAR track is assessed to be inconsistent if a heading angle change of the LiDAR track is equal to or over a first threshold and a rotational angle change of a contour of a point cloud resulted from the registration is equal to or below a second threshold, and the heading angle of the LiDAR track is assessed to be consistent otherwise.

15. The vehicle driving system of claim 14, wherein the heading angle of the LiDAR track is determined to be the heading angle of the final sensor fusion track when the heading angle of the LiDAR track is assessed to be consistent.

16. The vehicle driving system of claim 14, wherein, when the heading angle of the LiDAR track is assessed to be inconsistent, the heading angle of the LiDAR track is determined to be the heading angle of the final sensor fusion track if a difference between the heading angle and a path angle of the LiDAR track is equal to or below a third threshold and a difference between the heading angle and the path angle of the non-final sensor fusion track is equal to or over a fourth threshold.

17. The vehicle driving system of claim 16, wherein, when the heading angle of the LiDAR track is assessed to be inconsistent, the heading angle of the non-final sensor fusion track is determined to be the heading angle of the final sensor fusion track if the difference between the heading angle and the path angle of the LiDAR track is over the third threshold and the difference between the heading angle and the path angle of the non-final sensor fusion track is below the fourth threshold.

* * * * *